No. 700,862. Patented May 27, 1902.
H. B. WALTRIP.
CONVERTIBLE HARROW AND LAND ROLLER.
(Application filed July 29, 1901.)
(No Model.) 2 Sheets—Sheet 1.
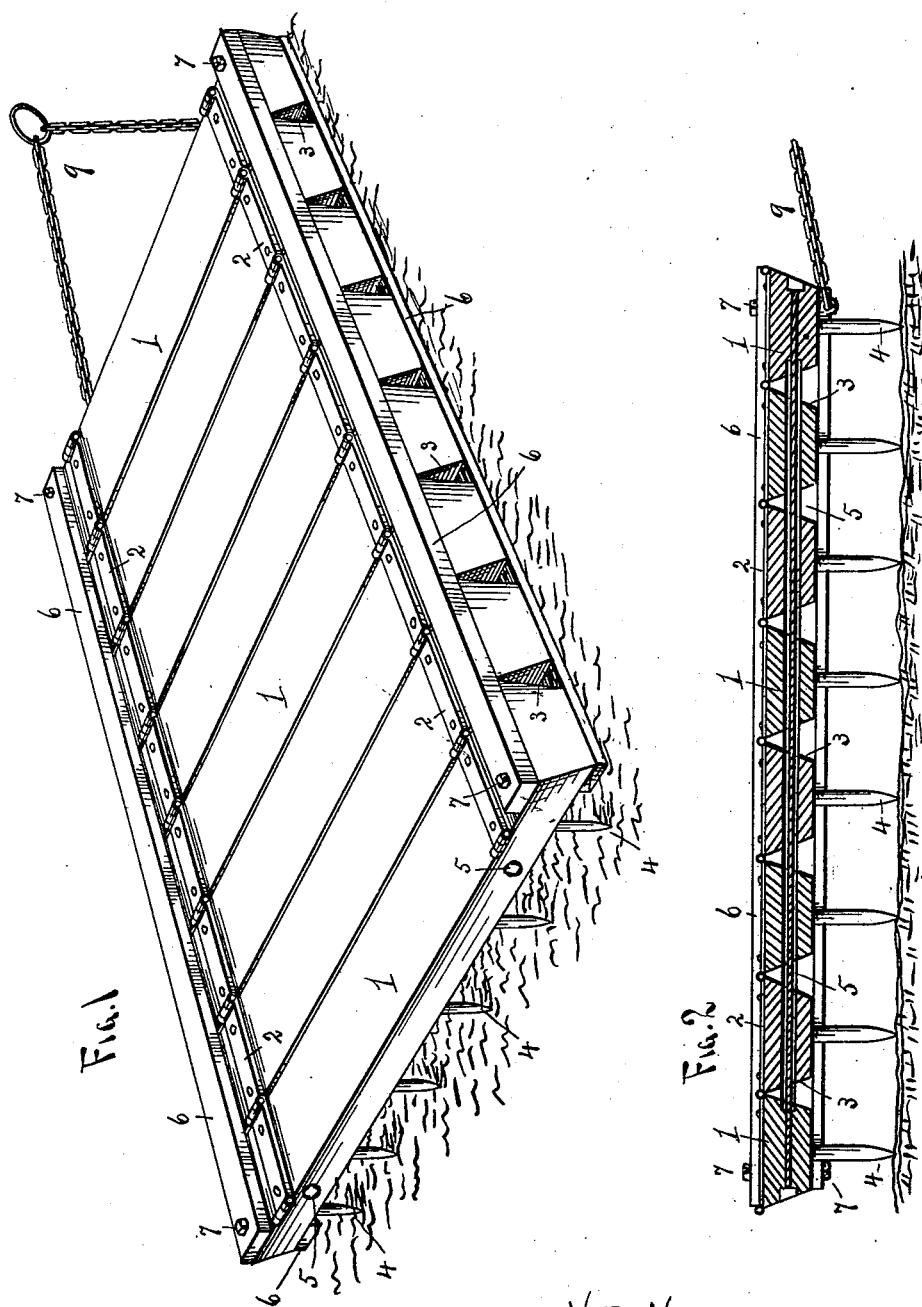
Witnesses
C. H. Woodward
J. W. Garner
H. B. WALTRIP, Inventor
by C. A. Snow & Co.
Attorneys No. 700,862. Patented May 27, 1902.
H. B. WALTRIP.
CONVERTIBLE HARROW AND LAND ROLLER.
(Application filed July 29, 1901.)
(No Model.) 2 Sheets—Sheet 2.
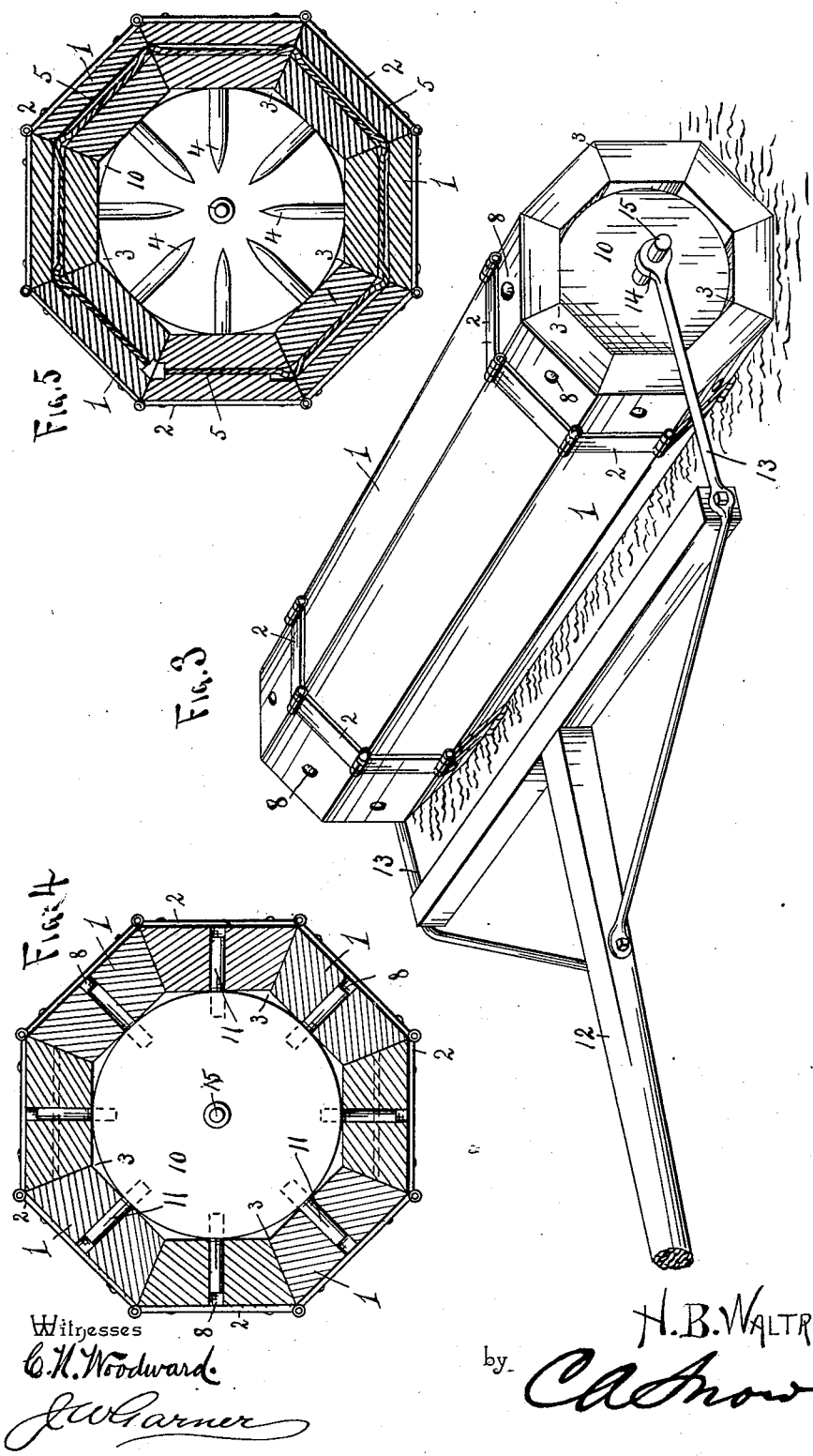

UNITED STATES PATENT OFFICE.

HENRY BUSH WALTRIP, OF EPLEY STATION, KENTUCKY, ASSIGNOR OF ONE-HALF TO JOHN W. TUNSTILL, OF EPLEY STATION, KENTUCKY.

CONVERTIBLE HARROW AND LAND-ROLLER.

SPECIFICATION forming part of Letters Patent No. 700,862, dated May 27, 1902.

Application filed July 29, 1901. Serial No. 70,159. (No model.)

*To all whom it may concern:*

Be it known that I, HENRY BUSH WALTRIP, a citizen of the United States, residing at Epley Station, in the county of Logan and State of Kentucky, have invented a new and useful Convertible Harrow and Land-Roller, of which the following is a specification.

My invention is an improved convertible harrow and land-roller; and it consists in the peculiar construction and combination of devices hereinafter fully set forth and claimed.

In the accompanying drawings, Figure 1 is a perspective view of my invention, showing the same arranged for use as a harrow. Fig. 2 is a vertical longitudinal sectional view of the same. Fig. 3 is a detail perspective view of my invention, showing the same arranged for use as a land-roller. Fig. 4 is a vertical transverse sectional view of the same. Fig. 5 is a similar view of the same, taken on a different plane.

In the embodiment of my invention I provide a series of transverse bars 1, which are disposed side by side and are connected together on one side by hinges 2. The sides of the bars 1 are beveled, as at 3, and thereby and by means of the hinge connection 2 the said bars may be either disposed as shown in Figs. 1 and 2 or they may be disposed to form a cylinder, as shown in Figs. 3, 4, and 5. Each of the said bars 1 is provided on the side opposite its hinge connections with harrow-teeth 4. The said bars 1 are connected together by flexible elements 5, which are preferably wire cables of suitable length and diameter and which are strung through alined openings in the said bars 1 and have their ends secured in the end bars. Said openings are at their ends of greater diameter than the said cables to enable the latter to buckle between the bars when the same are disposed to form a cylinder. When the invention is to be used as a harrow, the bars 1 are disposed in the same plane as shown in Figs. 1 and 2, and on the upper and lower sides thereof, at their ends, are placed longitudinally-disposed bars 6, which are bolted thereto, as at 7. Each of the bars 1 is provided near its ends with openings 8, which extend therethrough. The bars 6 not only form rigid connections between the bars 1, but serve also to close the said openings 8 and prevent the same from becoming choked with earth or other particles. A draft-chain 9 of suitable form is attached to one of the end bars 1 when the invention is used as a harrow, as shown in Fig. 2.

In order to adapt the invention for use also as a land-roller, I provide a pair of circular heads 10. The bars 6 being detached from the bars 1 and the draft-chain being also detached, the said bars 1 being then flexibly connected together by the hinged sections and the cords or cables 5, may be disposed to form a cylinder around the heads 10, as shown in Figs. 3, 4, and 5. The heads are provided with radial spurs 11, which enter the openings 8 in the bars 1 and serve to secure the said bars on the said heads. When thus disposed, the hinges 2 and the flexible elements 5 also connect the bars 1 together and retain the same on the heads 10 in cylindrical form. I further provide a draft-pole or tongue 12, which has draft bars or braces 13, having bearings 14 at their rear ends for spindles 15, with which the heads 10 are provided. Thereby the roller formed by the cylindrically-disposed bars 1 and heads 10 may be readily drawn and the same will rotate, as will be understood, and is entirely efficient for use as a land-roller for breaking up clods and pulverizing the soil. A seat for the driver may be secured on and carried by the tongue.

Having thus described my invention, I claim—

1. The combination of a flexible body comprising a series of bars and flexible connections between them, said body being disposed in cylindrical form, and heads in said cylindrically-formed body, said heads having projecting spurs and the bars of said flexible body having openings to receive said spurs, substantially as described.

2. In a convertible harrow and land-roller, a flexible body for the purpose set forth, comprising a series of bars disposed side by side, and provided with transverse alined openings, a flexible element extending through said openings and connecting said bars together, and flexible connecting elements, on one side of said bars and connecting them together, substantially as described.

In testimony that I claim the foregoing as my own I have hereto affixed my signature in the presence of two witnesses.

HENRY BUSH WALTRIP.

Witnesses:
W. W. HAZSLIP,
JOHN H. WALTRIP.